United States Patent [19]

Lomberty et al.

[11] Patent Number: 5,046,766
[45] Date of Patent: Sep. 10, 1991

[54] CONNECTOR FOR CORRUGATED TUBES

[75] Inventors: M. Marc Lomberty, Baume-les-Dames; M. Gabriel Rougeot, Roulans, both of France

[73] Assignee: Sofanou, S.A., Anteuil, France

[21] Appl. No.: 532,925

[22] Filed: Jun. 4, 1990

[30] Foreign Application Priority Data

Jun. 7, 1989 [FR] France .................. 89 07749

[51] Int. Cl.⁵ ............................................. F16L 21/00
[52] U.S. Cl. .................................. 285/419; 285/903; 403/344; 403/310; 174/92
[58] Field of Search ................. 285/903, 373, 419; 403/344, 218, 310, 311; 174/92

[56] References Cited

U.S. PATENT DOCUMENTS

| | | | |
|---|---|---|---|
| 3,068,316 | 12/1962 | Witt | 174/135 |
| 3,183,302 | 5/1965 | Wochner et al. | 174/92 X |
| 3,711,633 | 1/1973 | Ghirardi | 285/903 X |
| 4,443,031 | 4/1984 | Borsh | 285/419 |

Primary Examiner—Andrew V. Kundrat
Attorney, Agent, or Firm—Lackenbach Siegel Marzullo & Aronson

[57] ABSTRACT

A connector for corrugated tubes comprises a lower shell (100) and an upper cover (150) having lateral walls (110, 160) with several corresponding semi-circular openings (50) that define, when the cover has been closed on the shell, circular openings for receiving corrugated tubes. The openings (50) are fitted with a series of flexible fingers (10) in the form of truncated segments of a circle that form flexible skirts in the form of a circular crown around the openings. Internal semi-circular ribs (40) for longitudinally locking the fitted corrugated tubes are situated on arcuate tongues (30) arranged in a plane parallel to the corresponding opening. Each tongue (30) is connected either to the inner wall by a flexible arm (29), or to the bottom of the shell by its lower middle part.

7 Claims, 3 Drawing Sheets

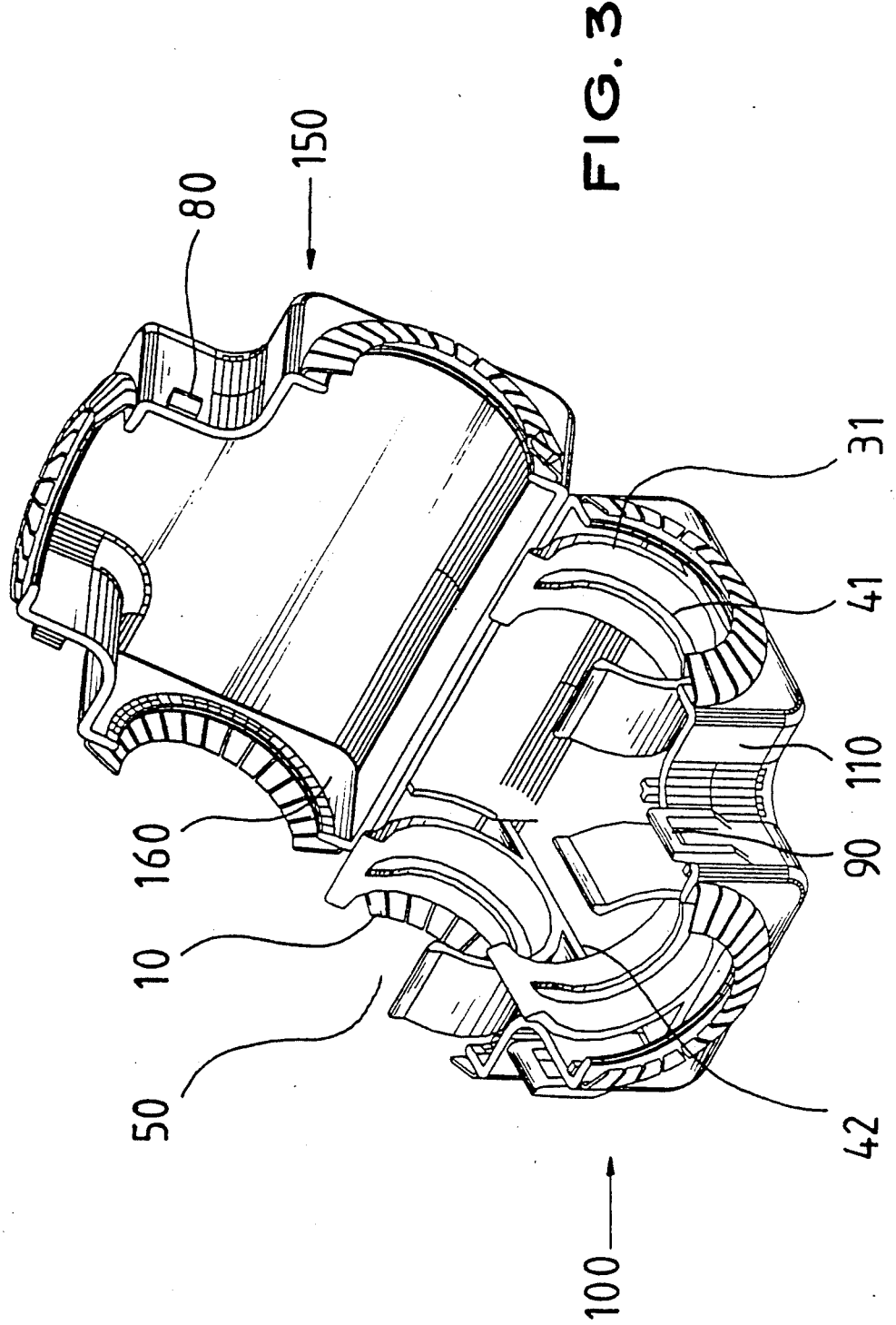

5,046,766

CONNECTOR FOR CORRUGATED TUBES

The present invention relates to a connector by means of which one or more corrugated tubes may be connected to one another and/or secured to a wall.

Corrugated tubes, i.e. tubes or conduits formed with a series of interconnected rings or corrugations, are usually made of plastics material such as extruded polypropylene. These tubes can be used to make networks of protective sheaths containing bundles of electric wires or cables in a building or in an automobile, especially around its engine. Because of the restricted space available, these cable sheaths must be able to fit very closely along non-rectilinear walls and pass around various obstacles. With these corrugated tubes, it is possible to make curves whose radius of curvature is less than twice their diameter, without any inward deformation or any breakage of the tube.

To make such networks easily and efficiently, securing pieces or connectors are used that make use of the tubes' corrugated configuration to longitudinally secure the tubes. U.S. Pat. No. 3,711,633, U.S. Pat. No. 4,443,031 and French patent 2,355,387 disclose generally tubular or T-shaped connectors formed of substantially symmetrical shells that are openable for the insertion of a corrugated tube and can then be closed and locked by means of hooks that engage in loops arranged around the opening. The insides of these connectors are fitted with ribs parallel to the planes of the tube-receiving openings (hence transverse to the opening axes). These ribs come to fit in between two rings of the corrugated tube and thereby hold the tube longitudinally and laterally.

Connectors of this type in common use have a major drawback. In order to correctly surround the corrugated tube to provide an adequate sealing of the joint and to enable the hooks to properly fit in the loops, the inner diameter of the openings of these rigid connectors is necessarily slightly greater than the outer diameter of the corrugated tube. This means that a large stock of connectors must be kept for tubes of different shapes and diameters. In addition to the cost of stock, there is always a risk that an inexperienced fitter may use ill-fitting connectors leading to a poor closure if the connector is too small, or to a poor sealing and therefore the ingress of dust, if the connector is too big.

An object of the present invention is to provide a connector for corrugated tubes comprising a lower shell and an upper cover, the shell and cover having lateral walls having therein corresponding semi-circular openings that define, when the cover is closed on the shell, circular openings for receiving corrugated tubes, the lateral walls having inner faces provided behind and parallel to said openings with arcuate (usually semi-circular) ribs for longitudinally holding fitted tubes, which connector can be used with a wide range of corrugated tubes of different diameters while firmly holding these tubes in place and adequately sealing a network of connected tubes.

This object is achieved according to the invention by means of a connector whose ribs are situated on flexible arcuate tongues connected to said inner faces in a plane parallel to the corresponding opening, each semi-circular opening being fitted with a series of flexible fingers in the shape of truncated segments of a circle forming a crown-like skirt for each circular opening.

According to an advantageous first embodiment, the inner face of only the shell is provided, behind and parallel to each semi-circular opening, with three ribs each situated on an arcuate tongue connected to its inner wall by a flexible arm, the three tongues being arranged with a bigger median tongue between and facing opposite to the two others. Advantageously, the shell and the cover are symmetrical about their joining plane and the afore-mentioned flexible arms are in the form of an inverted V having a first section connected to the inner wall and a second section supporting an arcuate tongue carrying a rib. In this case, the first sections of each of the three flexible arms adjacent to each opening are usefully fixed on a single supporting piece secured against the inner wall of the shell.

According to a second advantageous embodiment, the lower shell is provided, behind each semi-circular opening, with at least one tongue extending over 3/5ths to 4/5ths of a circle and carrying at least one arcuate (usually substantially semi-circular) rib, said tongue being connected by a central part thereof to the inside of the bottom of the shell, parallel to its semi-circular opening. It is then advantageous for the tongue to be integral with a generally flat central connecting part, the tongue and its connecting part being fitted in the shell. This shell and its cover may also be symmetrical relative to their plane of joining.

The invention is hereinafter described in greater detail with reference to several embodiments given by way of non-limiting example and illustrated in the accompanying drawings, in which:

FIG. 3 is a perspective view of a T-shaped connector according to a second embodiment designed for connecting three tubes.

Of course, connectors of other shapes such as cruciform or Y-shaped may also be provided within the scope of this invention. In the drawings, similar parts or elements are designated by the same references.

Figure 1:
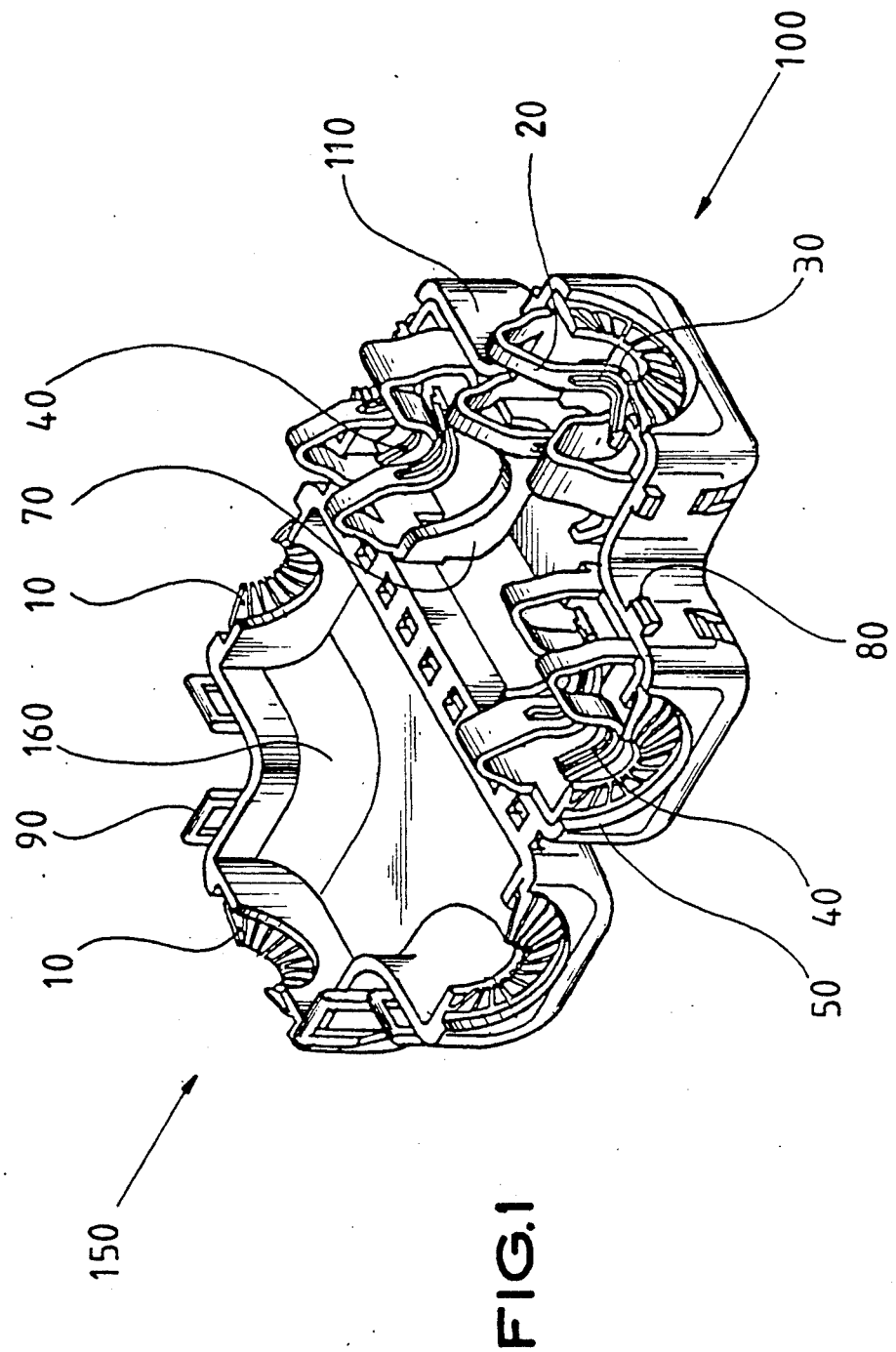
FIG. 1 is a perspective view of a T-shaped connector according to a first embodiment designed for connecting three tubes.

The T-shaped connector illustrated in FIG. 1 comprises an upper cover 150 connected to a lower shell 100 along their longitudinal common edge by a hinge, formed by a series of integral bridging parts of plastic material. The upper edges of walls 160 of the cover 150 away from the connecting edge are fitted with several loops 90 able to cooperate with lugs 80 arranged on the upper edges of side walls 110 of the shell 100, to thereby lock the connector once the cover 150 has been closed on shell 100. The side walls 160 also have three semi-circular openings 50 in correspondence with three identical semi-circular openings 50 in the walls 110 of shell 100. The openings 50 are fitted with a series of flexible fingers 10 in the form of truncated segments of a circle forming for each opening 50 a partial skirt in the form of a semi-circular crown. As can easily be seen, once the cover 150 has been closed onto the shell 100, the cooperating openings 50 with their fingers 10 form three circular openings partly obturated by a flexible skirt in the form of a circular crown.

In this first embodiment, the inner ribs 40, situated behind and parallel to the openings 50, are placed on respective arcuate tongues 30 that are each connected to the inner wall of the shell 100 by a flexible arm 20, and are also arranged in a plane parallel to the corresponding opening 50. In this embodiment, the tongue 30 is in fact not exactly in the shape of an arc of a circle, but rather is made up of a series of arcuate portions whose radius increases as the distance away from the arm 20 increases. As shown, only three ribs 40 are provided behind each opening, the tongue 30 that carryies the median rib being bigger than and facing opposite to the two other tongues 30.

In the embodiment shown in FIG. 1, the shell 100 and its cover 150 are symmetrical relative to their plane of joining, i.e. the height of each side wall 110 and 160 makes up half of the overall height of the connector. In this configuration, it has been found useful to increase the height of the point of rotation of the arms 20 holding the tongues 30 provided with their ribs 40, in the lower shell 100. For this, the arms 20 are made in the general form of an inverted V having a first section connected to the upper edge of shell 100 and a second section that carries the tongue 30. Hence, when the arm 20 is flexed, the arcuate tongue 30 describes an arc of increased radius providing, during a given angular displacement of the arm 20, an increasing tangential displacement of the tongue 30.

In manufacturing this connector, it has been found advantageous to separately mold (i) the shell 100 with its cover 150 and (ii) a series of parts 70 provided on their upper edge with the above-described arrangement of three arms and tongues. The bottom of these parts 70 is adapted to be inserted inside the shell 100 adjacent the rear side of each semi-circular opening 50 where it is then attached by an adhesive, welding or by staples.

Figure 2:
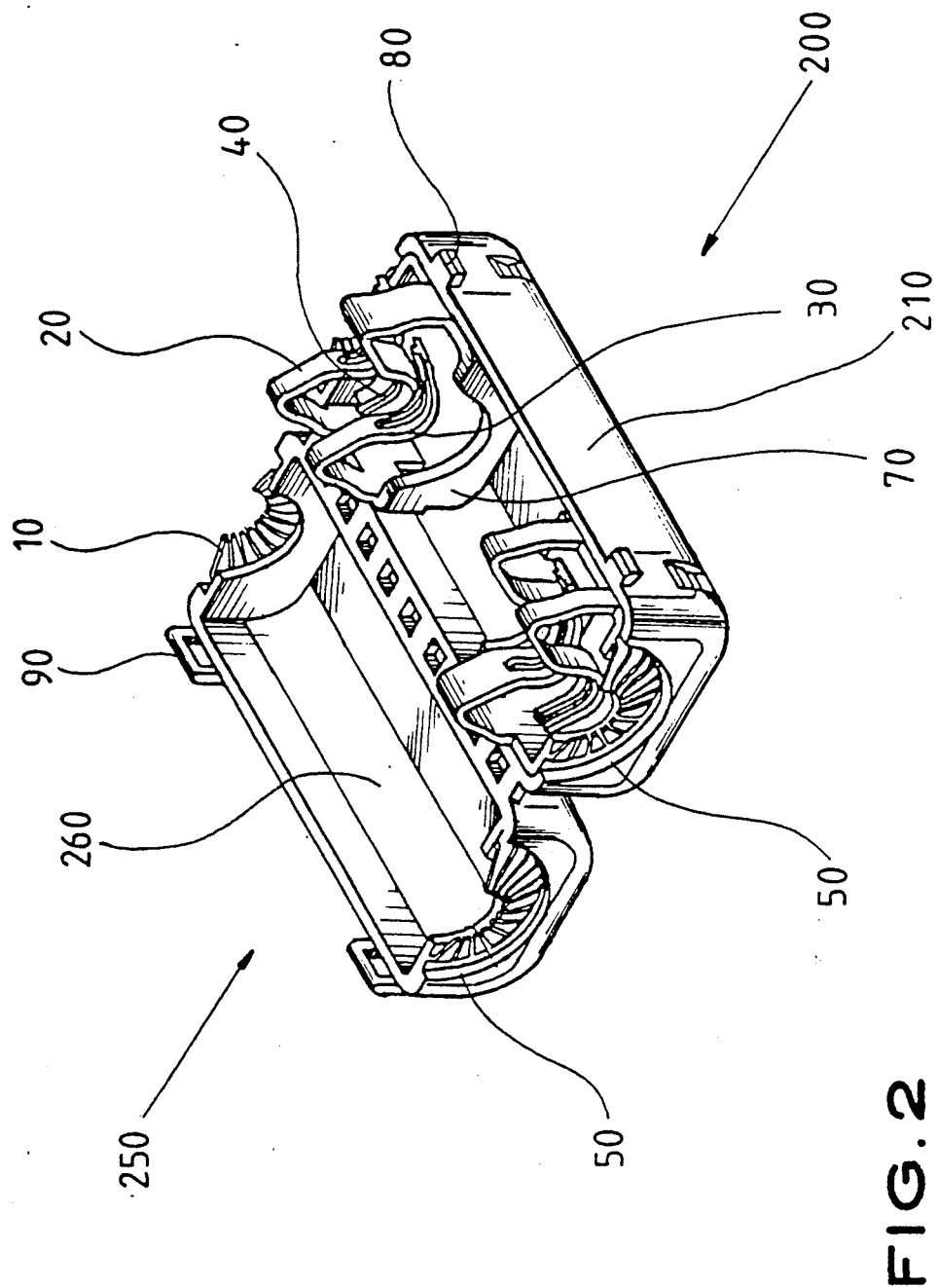
FIG. 2 is a perspective view of a longitudinal connector similar to the first embodiment but designed for connecting two tubes.

The element illustrated in FIG. 2 is designed for coupling two tube ends and includes a shell 200 of substantially parallelepipedic shape and a cover 250 symmetrical to the shell. The semi-circular openings 50 are situated at each end of the parallelepiped with parts 70 fitted with arms 20 and tongues 30 inserted inside the shell 200 adjacent each end.

To use the described connectors, firstly an end portion of a corrugated tube is inserted in the lower shell 100, 200 with the connector open, and the corrugated tube is pressed into the ribs 40 and fingers 10 until the tube axis comes into alignment with the axis of the opening (when closed). As the tube moves down, the tongues 30 flex downwards with an arcuate movement thus adapting to the diameter of the tube with a rib portion becoming inserted between the rings of the tube. The arrangement of the median tongue 30 in relation to the two others allows at least one rib to be placed on each right and left quadrant of the underneath half of the tube, thereby already providing a preliminary holding of the tube in the vertical direction. Due to the fact that the arms 20 are flexible only in a plane parallel to the semi-circular opening 50, and not longitudinally relative to the tube, the insertion of these ribs 40 between the tube rings already provides an adequate longitudinal holding of the tube. At the same time, the fingers 10 are flexed apart and fit closely around the underneath half of the tube.

Once the various tubes have been fitted and secured in the still-open lower shell 100, 200 the cover 150, 250 can be closed and its fingers 10 flex to confirm securing of the tube. Because of the resilience of the fingers 10 and arms 20, the loops 90 are easily clipped in the hooks 80 and, once in place, the connector cannot open unwantedly.

It can readily be understood that the minimum diameter of the corrugated tube is determined by the length of the fingers 10 and the initial spacing of the two sections making up the arms 20 of inverted V shape. The maximum diameter, however, is determined (i) by the dimensions of the semi-circular openings 50, less a space of about one millimeter required for total flexion of the fingers 10 and (ii) by the thickness of the two sections making up the arm 20 once these sections have been completely folded against one another. Thus, all tubes whose diameter is between these two extreme values fit without problem in these ribs 40 whose position is self-set and optimized by the arcuate movement of the corresponding tongues 30. An adequate sealing of the connector is provided by the skirt-forming fingers 10 surrounding the tube periphery.

As previously mentioned, many variations may be made to the multiple forms of the connector according to the invention including the mentioned cruciform, T-shaped and Y-shaped embodiments.

According to a first variation, the housing 100 may be deeper than the cover, for example in a ratio of approximately three-quarters to one-quarter of the total height. In this case, the semi-circular openings 50 are preferably each provided at the bottom of an enlarged recess in the lateral wall with the lower edge of the opening 50 remaining close to the bottom of the shell 100, and the side walls of the cover have extensions to accomodate for their semi-circular openings 50, these extensions corresponding to and fitting in the recesses of the side wall of the cover. As the side walls of this shell 100 are higher, the arms 20 may simply take the form of integral tongues or strips of plastic extending from the upper edges, which avoids the need for the more complex inverted V shape. Despite its apparently simpler design, this variation is however somewhat more difficult to produce because of molding of the shell, the cover and the ribs mounted on their tongues/arms all in one piece.

According to another variation, the shell 100 is provided with two ribs on tongues arranged on the same side, adjacent to the openings 50 and the cover is provided with two side-by-side tongues but arranged on the other side of the corresponding opening 50. The production of this variation is also more complex, but this design provides a grip on one lower quadrant and on a symmetrical upper quadrant of the tube.

A second embodiment of the invention will now be described with reference to FIG. 3 illustrating a connector housing for three tubes. As before, there is an upper cover 150 connected to a lower shell 100 by a hinge-forming bridge of plastic material extending along the common longitudinal edge. As illustrated, the cover 150 and shell 100 are symmetrical relative to their plane of joining, without this however being an essential feature. The closure means, hooks 80 and loops 90, can also be seen as well as the semi-circular openings 50 in the side walls that, when the connector is closed, form apertures for receiving corrugated tubes. These apertures are also fitted with flexible fingers 10 for sealing the tube/connector joint.

However, in this second embodiment, ribs 41 for securing the corrugated tubes are located on bigger arcuate tongues 31 extending over three-quarters of a circle, these tongues 31 being connected at their centers to the bottom of the shell with their two ends upstanding. Of course, alternatively, opposite each opening there could be either several parallel ribs on one tongue, or there could be several parallel tongues each carrying a rib.

Advantageously, the tongue 31-rib 41 unit, including its securing part 42, may be produced separately from the housing, then fitted later. The securing means shown in FIG. 3 is made of an integral, flexible bar 42 underneath the center of the tongue 31, this bar 42 being force-fitted between the lower ends of two opposite walls. Alternatively, the securing means may be a tenon, integral with the tongue that fits in a corresponding hole of the housing and is possibly fixed by adhesive or by welding.

It can readily be understood that, in use, the arcuate tongue 31 acts as a clip about a fitted corrugated tube, thereby providing an adequate preliminary grip. The minimum diameter of a tube to be fitted is determined by the initial radius of curvature of the tongue 31; and the possible range of maximum diameters of tubes to be fitted depends on the degree of closure of the tongue, i.e. ¾ to 4/5 of a circle, because an over-closed tongue would be more difficult to manipulate. When three tubes have been fitted, the cover 150 is simply folded closed and locked to the shell 100 to close the connector with good sealing.

Numerous improvements may be made to these connectors within the scope of this invention as set out in the appended claims.

We claim:

1. A connector for corrugated tubes, comprising a lower shell and an upper cover that can be closed together, the shell and cover having lateral walls having therein corresponding semi-circular openings that define, when the cover is closed on the shell, circular openings for receiving corrugated tubes, the lateral walls having inner faces provided behind and parallel to said openings with arcuate ribs for longitudinally holding fitted tubes, wherein the ribs are situated on flexible arcuate tongues connected to said inner faces in a plane parallel to the corresponding opening, each semi-circular opening being fitted with a series of flexible fingers in the shape of truncated segments of a circle forming a crown-like skirt for each circular opening.

2. A connector for corrugated tubes according to claim 1, wherein the inner face of only the shell is provided, behind and parallel to each semi-circular opening, with three ribs, each situated on an arcuate tongue connected to its inner wall by a flexible arm, there being a bigger median tongue between and facing opposite to the two others.

3. A connector for corrugated tubes according to claim 2, wherein the shell and the cover are symmetrical relative to their plane of joining and the flexible arms are each in the form of an inverted V having a first section connected to the inner wall and a second section supporting an arcuate tongue carrying a rib.

4. A connector for corrugated tubes according to claim 3, wherein the first sections of each of the three flexible arms adjacent to each opening are fixed on a single supporting piece secured against the inner wall of the shell.

5. A connector for corrugated tubes according to claim 1, wherein the lower shell is provided, behind each semi-circular opening, with at least one tongue extending over 3/5ths to 4/5ths of a circle and carrying at least one rib, said tongue being connected by a central part thereof to the inside of the bottom of the shell, parallel to its semi-circular opening.

6. A connector for corrugated tubes according to claim 5, wherein the tongue is integral with a generally flat central connecting part, the tongue and its connecting part being fitted in the shell.

7. A connector for corrugated tubes according to claim 5, wherein the shell and the cover are symmetrical relative to their plane of joining.

* * * * *